UNITED STATES PATENT OFFICE.

DAVID GRIM, OF COPLEY, ILLINOIS.

IMPROVEMENT IN MEDICAL COMPOUNDS OR OINTMENTS.

Specification forming part of Letters Patent No. 149,853, dated April 21, 1874; application filed March 17, 1874.

*To all whom it may concern:*

Be it known that I, DAVID GRIM, of Copley, in the county of Knox and in the State of Illinois, have invented an Ointment or Medicine for the Cure of Piles; and do hereby declare that the following is a full, clear, and exact description of the ingredients of the same, the quantities and mode of preparing, compounding, and administering the same:

Take of oil of hemlock, one and one-fourth ounce; oil of origanum, four and one-half ounces; oil of wormwood, two ounces; oil of winter-green, one ounce; oil of red cedar, one ounce; oil of Harlem, one ounce; powdered nut-gall, one ounce; one bottle of Robert Turlington's balsam; mutton-tallow, one and one-fourth pound; lard, one-fourth of one pound; bees-wax, one ounce.

First melt the tallow, lard, and bees-wax over a slow fire, and when thoroughly fused remove it and stir the mixture until it becomes cooled to the temperature of blood-heat, then add the remainder of the ingredients and stir the whole until it is cold, at which time it is ready for use, and may be applied three times a day.

With this ointment may be taken internally, once a day, one table-spoonful of native wine, in which has been steeped pulverized dried *Asclepias syriaca* in the proportion of two ounces of the latter to one pint of the former.

What I claim as my invention is—

The compound ointment or pile remedy, prepared and compounded, and to be used in the manner substantially as described.

In testimony that I claim the foregoing medical compound I have hereunto set my hand this 11th day of March, 1874.

DAVID GRIM.

Witnesses:
JAMES W. NEALE,
JOHN M. NEALE.